United States Patent [19]

Baversten et al.

[11] Patent Number: 5,430,779
[45] Date of Patent: Jul. 4, 1995

[54] APPARATUS FOR SUPPORTING A SHROUD IN A NUCLEAR REACTOR

[75] Inventors: Bengt. I. Baversten, Weatogue; Adrian P. Wivagg, Tolland, both of Conn.

[73] Assignee: Combustion Engineering, Inc., Windsor, Conn.

[21] Appl. No.: 242,874

[22] Filed: May 16, 1994

[51] Int. Cl.[6] ............................................. G21C 15/00
[52] U.S. Cl. ................................... 376/287; 376/302; 376/461
[58] Field of Search ............... 376/285, 287, 294, 302, 376/347, 461, 463

[56] References Cited

U.S. PATENT DOCUMENTS

| | | | |
|---|---|---|---|
| 3,660,231 | 5/1972 | Fox et al. | 376/302 |
| 3,850,795 | 11/1974 | Thome | 376/302 |
| 4,001,079 | 1/1977 | Rylatt | 376/285 |
| 4,199,403 | 4/1980 | Puri et al. | 376/302 |
| 4,379,119 | 4/1983 | Fujimoto | 376/302 |
| 4,409,179 | 10/1983 | Burger | 376/302 |
| 5,283,809 | 2/1994 | Challberg et al. | 376/463 |

Primary Examiner—Daniel D. Wasil
Attorney, Agent, or Firm—Ronald P. Kananen; John H. Mulholland

[57] ABSTRACT

In order to eliminate the need to weld, drill or otherwise machine a shroud structure which is used to surround a plurality of fuel assemblies in a nuclear reactor, a support ring which either seats on top of the upper edge of the shroud, or is formed in multiple segments and is clamped to the side wall of the shroud, have hangers which are rigid therewith on which support hooks can be detachably mounted. The hooks are arranged to be engagable with the inner peripheral wall of the RPV in a manner which prevents lateral movement of the shroud within the pressure vessel.

10 Claims, 5 Drawing Sheets

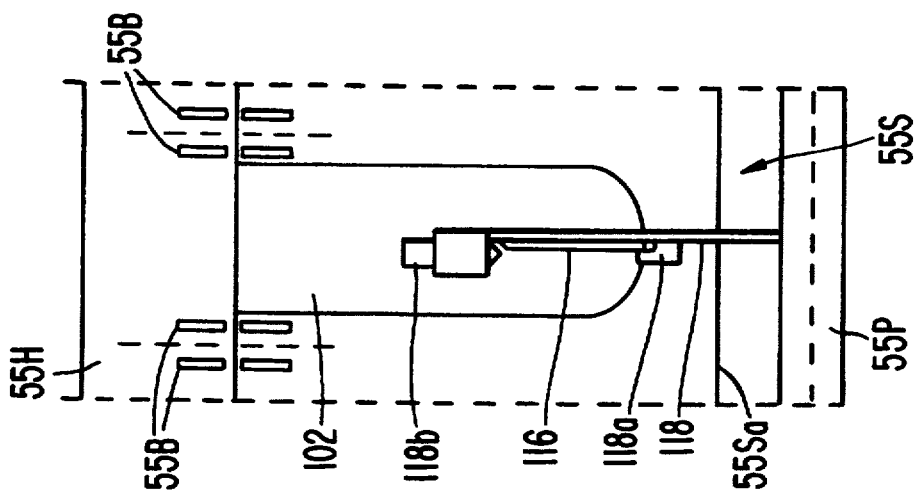
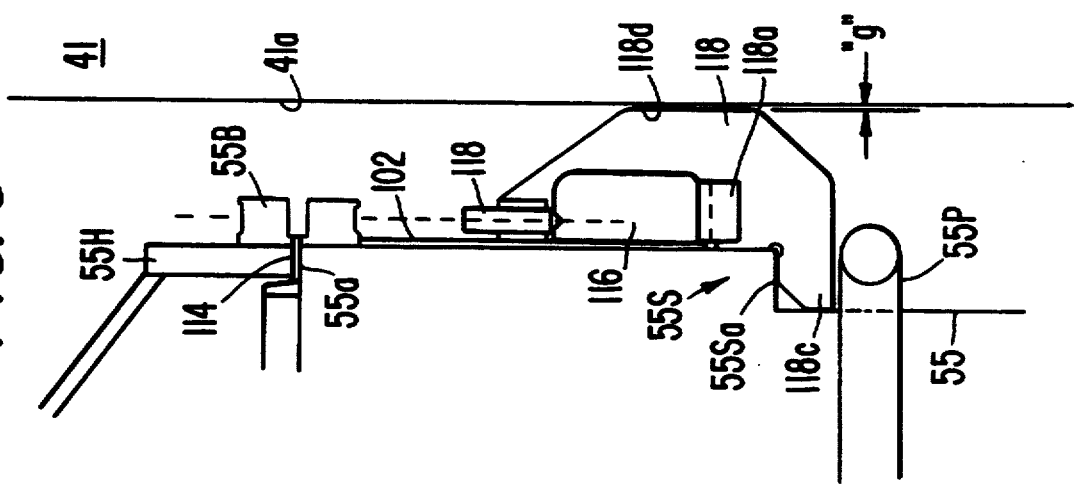

APPARATUS FOR SUPPORTING A SHROUD IN A NUCLEAR REACTOR

BACKGROUND OF THE INVENTION

1. Field of the Invention

The present invention relates generally to nuclear reactors. More specifically, the present invention relates to a support arrangement by way of which a shroud can be supported within a reactor pressure vessel and which eliminates the need for welding, drilling, or other machining of the shroud structure.

2. Description of the Related Art

As is well known, safety is a paramount concern in devices such as nuclear reactors and stringent measures must be exercised to ensure that mechanical failures, such as which tend to be induced by the formation of cracks and the like in various and numerous structures which comprise a nuclear reactor, are eliminated.

It has been discovered that various stresses in a shroud structure used to enclose the fuel assemblies tend to produce cracks. For example, cracks can form in the shroud at the horizontal weld joint between the top guide support ring and the shroud. This, of course, induces a safety concern in that, if the weld were to break, the shroud could shift laterally within the RPV and cause problem such as interfering with control rod insertion.

SUMMARY OF THE INVENTION

It is an object of the invention to provide an arrangement via which a shroud can be supported within a reactor pressure vessel (RPV) in a manner which does not induce stresses and associated cracking and the like type of deterioration of the shroud assembly, which can be connected to the shroud using only light clamping, and which does not require any welding, aperturing via drilling, or the like type of machining of the shroud assembly.

It is a further object of the present invention to provide an arrangement via which a shroud or the like type of structure, can be securely supported against lateral movement within a RPV or the like type of vessel without the need to weld, drill or otherwise machine the shroud.

The present invention provides an arrangement by which a core shroud can be supported in a BWR and which features support hook members which are supported at the upper end of the shroud and which can arranged so that a small gap is provided between the outboard edge of the support hooks and the reactor pressure vessel (RPV) wall. The small gaps are provided in order to compensate for the thermal expansion which occurs between the shroud and the RPV wall and to prevent anything more than minute lateral movement of the shroud with respect to the RPV.

In accordance with a preferred form of the present invention, the disposition of the support ring on the upper edge of the shroud is such as to enable it to be sandwiched between the shroud and the shroud head and thus maintained very securely in place. While the thickness of the supporting ring can be from $\frac{1}{4}-\frac{3}{4}$ (0.64 cm—1.90 cm) by way of example, and causes the shroud head and the steam separators to be installed at a slightly higher lever than normal within the RPV, this slight increase in height has no detrimental influence on the performance of the reactor.

The integral arrangement of the support ring and dependent hangers allows the arrangement to be lowered into place as a unit and thus facilitates quick and easy installation.

The position and spacing of the hangers about the support ring can selected in a manner which enables the insertion of inspection tools to be facilitated. The spacing, number and configuration of the hangers can be varied on a case by case basis so as to allow for varying situations such as avoiding interfering brackets and the like, and thus enable the invention to be applied to a wide variety of different types of reactor arrangements.

More specifically, a first aspect of the present invention resides in a shroud support arrangement for supporting a shroud which surrounds a fuel assembly in a reactor pressure vessel, which features a support structure which is supported on the exterior of the shroud, which includes a plurality of detachably connected projections that are engagable with the wall of the reactor pressure vessel and that prevent lateral movement of the shroud within the reactor pressure vessel.

A second aspect of the present invention resides in a shroud support arrangement for supporting a shroud which surrounds a fuel assembly in a reactor vessel, and which comprises: a support ring member operatively connected with an upper peripheral portion of the shroud; a plurality of hangers which are fixedly connected to the support ring member and which extend along the external peripheral surface of the shroud to a level which is proximate a stepped diameter portion of the shroud and which includes an essentially horizontal surface portion, the hangers each having a hanger plate; and a plurality of support hooks which are each detachably supported on a hanger plate and which are so shaped and dimensioned that a hook portion which is formed on each of the support hooks, engages the inwardly extending surface portion, the support hooks each having a vertically extending edge portion which is arranged to engage the inner periphery of the reactor vessel and prevent the shroud from laterally moving within the reactor vessel.

A third aspect of the present invention resides in a nuclear reactor which features: a shroud disposed within a reactor vessel so as to surround at least one fuel assembly; and a shroud support arrangement for supporting the shroud in the reactor vessel, comprising: a support ring disposed on the upper peripheral edge of the shroud, the support ring being adapted to have a shroud head seat on top thereof; and a plurality of hangers which are fixedly connected at their upper ends to the support ring and which extend down along the external peripheral surface of the shroud to a level which is above a stepped diameter portion of the shroud which includes a radially inward extending surface portion; a plurality of hanger plates, each of the hanger plates being rigidly connected to a hanger; and a plurality of support hooks which are each adapted to be detachably supported on a hanger plate and which are so shaped and dimensioned that a hook portion formed on each of the support hooks fits under the inwardly extending surface portion, each of the support hooks being provided with a lock bolt which can be adjusted in a manner to engage an upper portion of a hanger plate and produce a reaction which moves the support hook upwardly and causes the hook portion to engage with the horizontally extending surface, the support hooks each having a vertically extending edge portion which is arranged to engage the inner periphery of the reactor vessel and prevent lateral motion of the shroud within the reactor vessel.

A further aspect of the invention resides in a method of supporting a shroud with a nuclear reactor pressure vessel, comprising the steps of: lowering a support ring structure having a plurality of support hook supporting members thereon, into the pressure vessel; securing the support ring to an upper portion of the shroud; lowering support hooks into the pressure vessel; mounting the support hooks on the hook supporting members and securing the support hooks in position on the hook supporting members, the support hooks each having a vertical shoulder portion which closely juxtaposes the inner periphery of the pressure vessel wall when mounted on a hook supporting member.

BRIEF DESCRIPTION OF THE DRAWINGS

The various objects, advantages and merits of the present invention will become more clearly appreciated as a detailed description of the preferred embodiments of the invention are given in conjunction with the appended drawings in which:

FIG. 6 is a side elevational view showing details of how the hanger plate which interconnects the support ring and a detachable support hook, are arranged with respect to one another and how lateral movement of the shroud is attenuated;

FIG. 7 is a side view showing details of the hanger plate and support hook shown in FIG. 2.

DETAILED DESCRIPTION OF THE PREFERRED EMBODIMENTS

Figure 1:
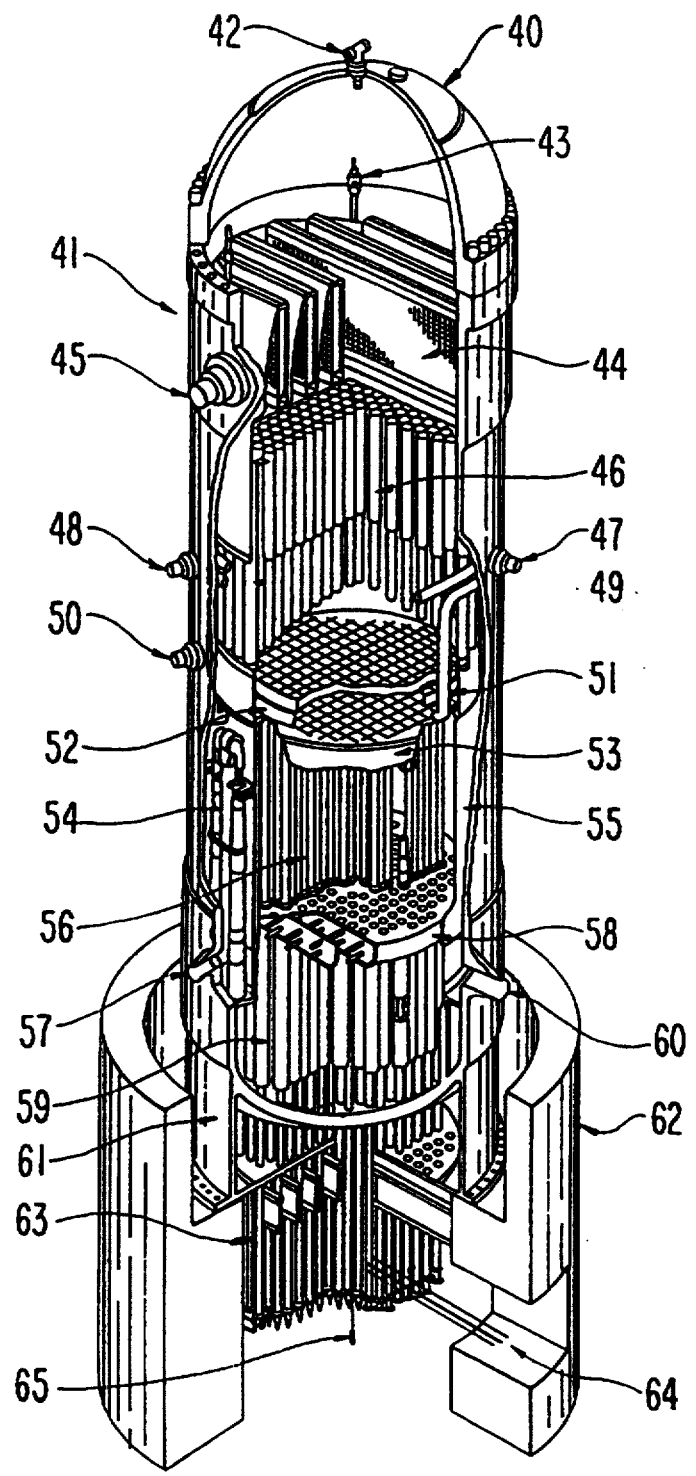
FIG. 1 is a cut-away perspective view of one of the types of nuclear reactor to which the present invention can be applied.

FIG. 1 is a perspective partially cut-away view of a boiling water reactor of a type to which the present invention is applicable. This BWR (boiling water reactor) includes, merely by way of example, a head 40 which is secured to the top of the reactor pressure vessel (RPV) 41, a vent and head spray 42, a steam dryer lifting lug 43, a steam drier assembly 44, a steam outlet 45, a steam separator assembly 46, a feedwater inlet 47, a core spray inlet 48, a feedwater sparger 49, a low pressure coolant injection inlet 50, a core spray line 51, a core sprayer sparger 52, a top guide 53, jet pump assemblies 54, a core shroud 55, fuel assemblies 56, a jet pump/recirculation water inlet 57, a core plate 58, control rods 59 (enclosed in elongate tubular guide thimbles), a recirculation water outlet 60, a vessel support skirt 61, a shield wall 62, control rod drive mechanisms 63, control rod drive hydraulic lines 64, and an in-core flux monitor 65.

Figure 2:
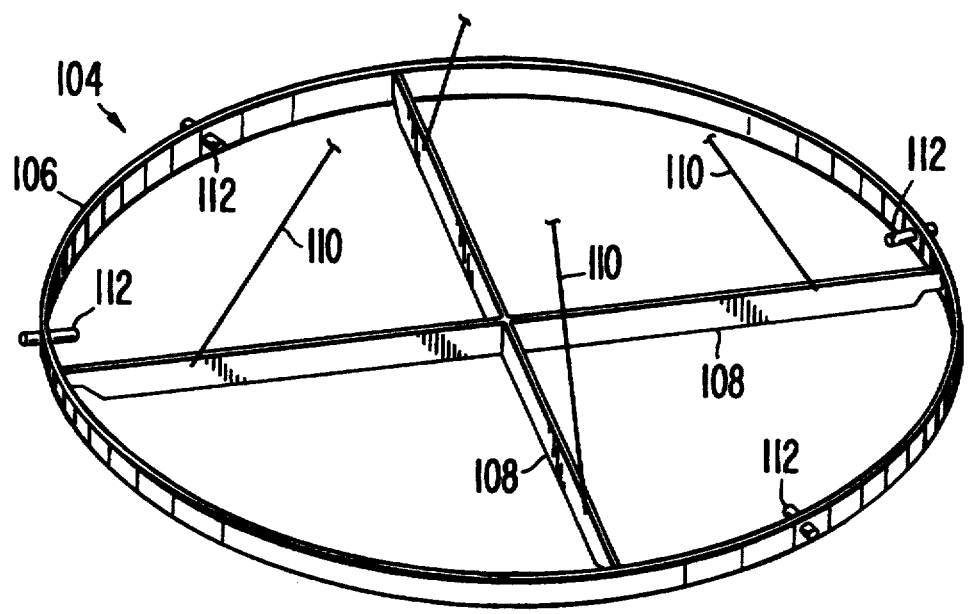
FIG. 2 is a perspective view of a "strongback" which is used to lower a support ring structure according to the present invention into position on the upper edge of the shroud.
Figure 3:
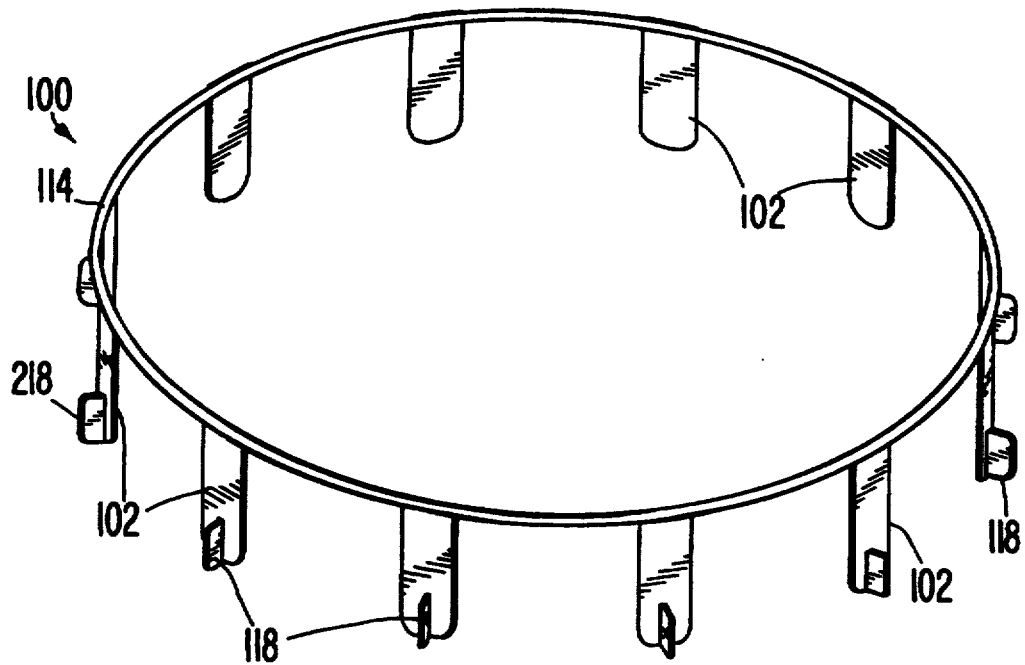
FIG. 3 is a perspective view showing a support ring and hanger arrangement according to a first embodiment of the present invention.

FIGS. 2 to 7 show details of a first embodiment of the present invention. In this arrangement, a support ring 100 which is provided with a plurality of downward depending integral hangers 102, is arranged to be lowered into the RPV by way of a "strongback" device 104. As shown in FIG. 2, the strongback 104 comprises a circular hoop-like structure 106 with intersecting cross-rib reinforcements 108. Cables 110 interconnect the cross-ribs 108 with an overhead crane (not shown). A plurality air cylinders 112 are formed about the periphery of the of the circular hoop structure 106 and are arranged to be selectively controllable to allow the support ring 100 to be selectively grasped and released.

The support ring 100 according to the first embodiment of the invention comprises a flat annular member 114 having a relatively small vertical thickness and which is arranged to seat on the upper edge 55a of the shroud 55 in the manner best seen in FIG. 6. The shroud head 55H is arranged to seat on top of the annular member 114 and thus clamp the support ring 100 in place. In this embodiment, the hangers 102 comprise flat members which extend at right angles to the support ring and which lay flat against the external surface of the shroud 55 in the manner depicted in FIGS. 6 and 7. As will be appreciated, these hangers can be arranged to have slightly curved cross-sections (as seen in plan) so as to fit against the curved outer surface of the cylindrical shroud 55.

Each of the hangers 102 is formed with a hanger plate 116 which extends out normally from the outer major surface of the hanger 102. When the support ring 100 is placed in position, these hanger plates 116 are arranged to extend radially outward toward the inner peripheral wall 41a of the RPV 41.

Each of the hanger plates 116 is arranged to receive a support hook 118. As shown in FIGS. 6 and 7 these support hooks 118 are arranged to seat against one side face of a hanger plate 116 and to have a retaining flange 118a which hooks under the lower edge of the hanger plate 116, and a lock bolt 118b which can be tightened in a manner which allows the support hook 118 to be lifted up relative to the hanger plate 116 until such time as the retaining flange 118a is securely engaged with the lower edge of the hanger plate 116.

In this embodiment, the support hooks 118 are designed for use with a reactor wherein core spray pipes 55P are arranged to extend along at a level which is relatively close to the level at which a shoulder 55S is defined by a stepped diameter portion of the shroud 55. As will be appreciated from FIG. 6, this shoulder 55S of the shroud includes a horizontally extending surface 55Sa. Accordingly, the support hooks 118 in this embodiment are arranged to have a hook portion 118c which extends between the horizontally extending surface 55Sa and the core spray pipes 55P.

In order to prevent the shroud 55 from moving laterally within the RPV 41, the support hooks 118 are each provided with a vertically extending shoulder 118d which is arranged to closely juxtapose the inner periphery of the RPV 41. As will be appreciated from FIG. 6, the support hooks 118 are so sized and shaped that a small gap "g" is established between the RPV 41 and each of the vertically extending shoulders 118d at ambient temperatures. These gaps "g" are arranged to allow for the thermal expansion which occurs when the reactor is undergoing normal operation.

As will be appreciated, once the support ring 110 is placed in positing and the locked in position by the disposition of the shroud head 55H on top of it, no movement of the support ring 100 is possible. As pointed out above, although the provision of the support ring 100 in the illustrated position is such as to increase the overall height of the shroud arrangement (shroud and shroud head), this has no adverse effect on the operation of the reactor.

Figure 4:
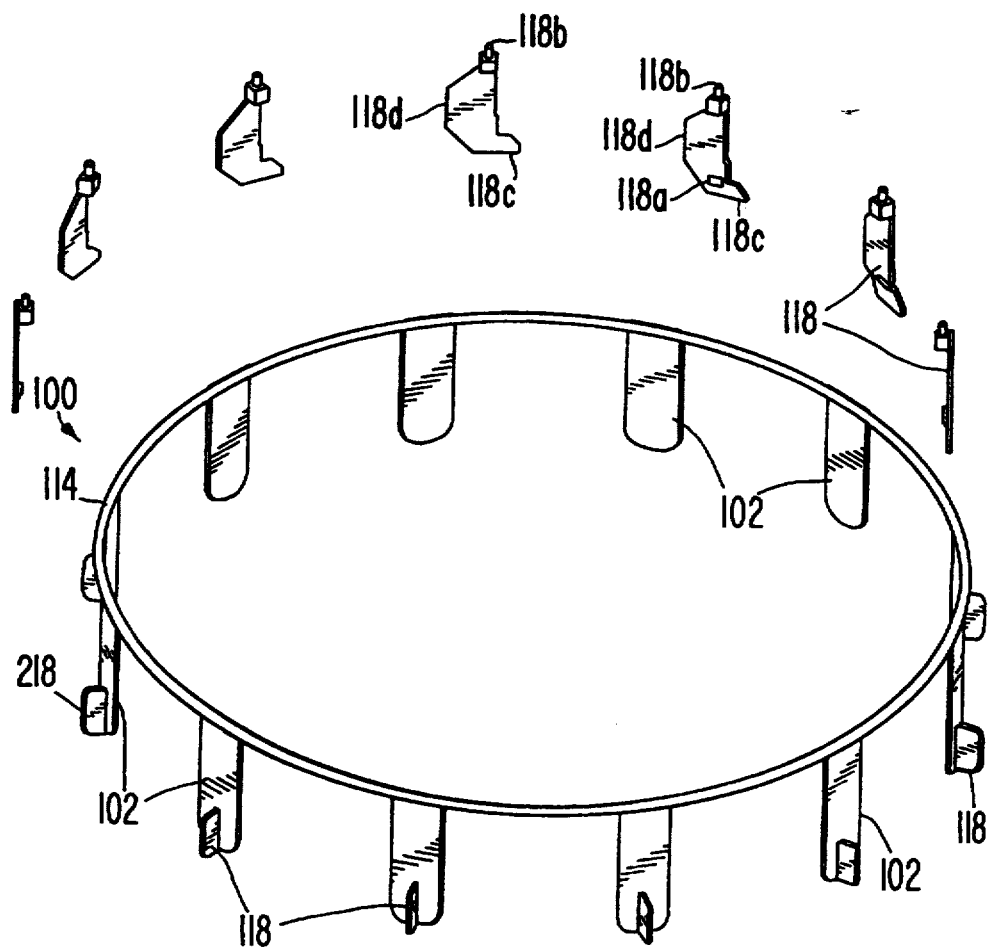
FIG. 4 is a exploded perspective view which shows the first embodiment of the present invention and the manner in which support hooks are lowered toward the support ring and associated hanger plates of the invention.
Figure 5:
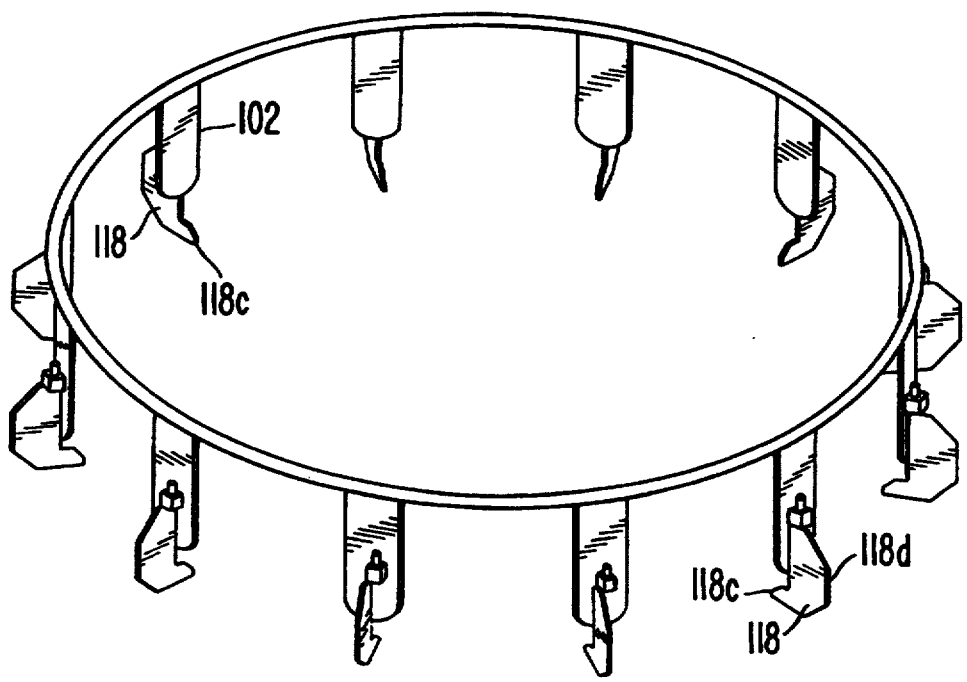
FIG. 5 is a perspective view similar to that shown in FIG. 4, which shows the support hooks disposed in operative positions on the hanger plates.

Mounting of the support hooks 118 is carried out after the support ring 100 is disposed in place through use of the strongback 104. In accordance with the invention, in order to facilitate the disposition of the support hooks 118, each of the support hooks 118 is, as shown in FIG. 4, lowered into the RPV 41 while turned at an angle with respect to the hanger plate 116 on which it is to be suspended. After reaching the appropriate height, the support hook 118 is rotated to the appropriate angle so that hook portion 118c of the support hook moves in under the horizontal surface 55Sa and a major surface of the support hook 118 comes into face-to-face contact with a major surface of the hook plate 116 on which it is to be supported. Thereafter, the support hook 118 is lifted so that the connection flange 118a hooks under the lower edge of the hanger plate 116. This is followed or accompanied by a tightening of the lock bolt 118b to secure the support hook on the hanger plate 116.

SECOND EMBODIMENT

Figure 8:
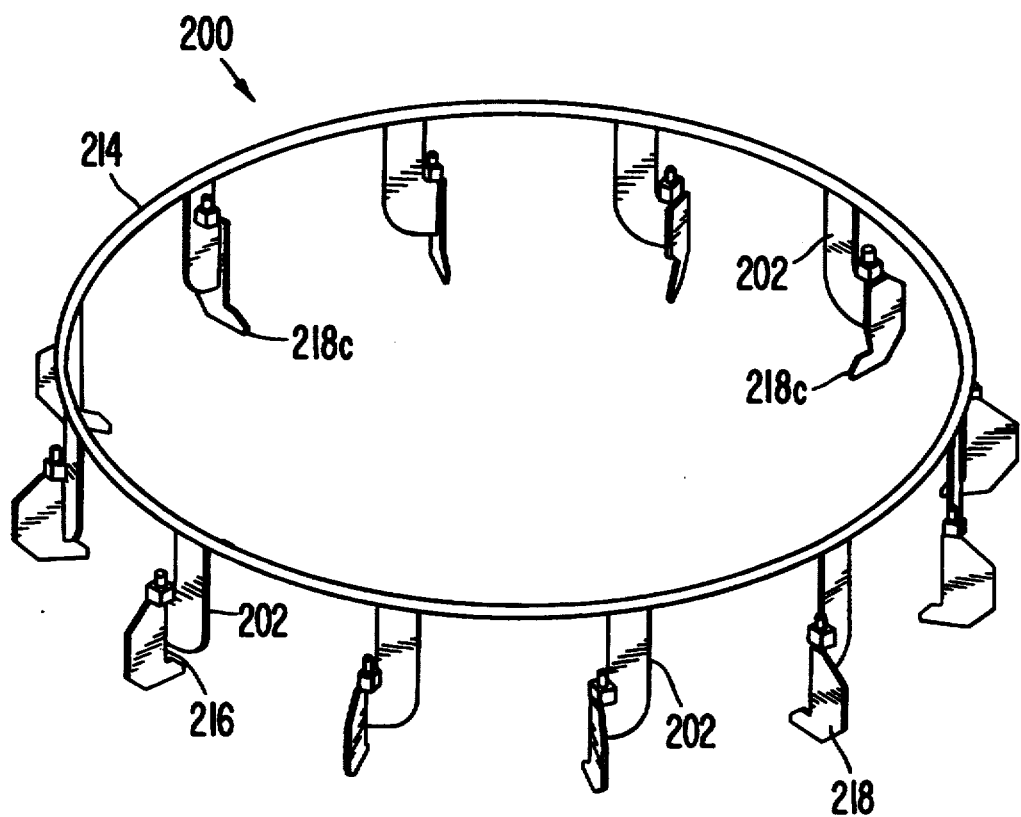
FIG. 8 is a perspective view of a support ring and hook arrangement according to a second embodiment of the present invention.

FIG. 8 shows a second embodiment of the present invention. This embodiment is basically similar to the one shown in FIGS. 2 to 7 and differs in that the hangers 202 are configured in a manner which allows the same to be located in position which facilitates the insertion of inspection apparatus down through the annular gap which is defined between the shroud 55 and the RPV inner wall 41a. That is to say, the hangers 202 are formed to have an essentially J-shape the ends of which are bent to extend radially outward and thus from hanger plates 216. With this arrangement, the support ring 200 can be lowered into position atop the upper edge of the shroud 55 and then rotated so that portions of the hangers 202 on which the hanger plates 216 are formed, assume positions below the shroud head bolt brackets 55B. This of course opens up a space through which the inspection tools and devices can be lowered and thus avoid the shroud head bolt brackets 55B which of course jut out into the annular spaced defined between the shroud 55 and the RPV 41.

It will be noted that the present invention is not limited to the support ring and hanger arrangement which is arranged to seat on the upper edge 55a of the shroud 55 and to be sandwiched in place, and it is within the scope of the present invention to utilize a clamping band arrangement with in or in combination with the support ring type of arrangement. That is to say, it is within the scope of the present invention to form a multi-segment band arrangement which can be selectively tightened against the outer wall of the shroud and to support the hangers on the multi-segment band.

It is also within the scope of the present invention to combine the arrangements disclosed above with tie rod and hanger rod types of arrangements of the nature disclosed in copending U.S. Pat. applications Attorney document Nos. ABB-081, ABB-084, and ABB-085.

It will also be appreciated that the present invention is not limited to the disclosed embodiments and that various modifications and changes can be made without departing from the scope which is defined by the appended claims.

What is claimed is:

1. A shroud support arrangement for supporting a shroud which surrounds a fuel assembly in a reactor vessel, comprising:
   a support ring member operatively connected with an upper peripheral portion of said shroud;
   a plurality of hangers which are fixedly connected to said support ring member and which extend along the external peripheral surface of said shroud, said hangers each having a hanger plate; and
   a plurality of support hooks which are each detachably supported on a hanger plate and which are so shaped and dimensioned that a hook portion which is formed on each of said support hooks, engages a portion of said shroud, said support hooks each having a vertically extending edge portion which is arranged to engage the inner periphery of said reactor vessel and prevent lateral motion of said shroud within said reactor vessel.

2. A shroud support arrangement as set forth in claim 1, wherein said hangers are shaped so that upon a predetermined amount of rotation of said support ring member, the hanger plates formed on said hangers assume positions below projections which extend out from said shroud.

3. A shroud support arrangement as set forth in claim 2, wherein said hangers have an essentially J-shape and wherein said hanger plates are formed at the lower end of the J shape.

4. A shroud support arrangement as set forth in claim 1, wherein said support ring has an annular portion which is disposed on the upper peripheral edge of said shroud in a position wherein a shroud head can seat atop of said annular portion in a manner which secures said support ring in position between said shroud and said shroud head.

5. A shroud support arrangement as set forth in claim 1, wherein each of said support hooks includes a connection flange which is arranged to fit over a portion of a hanger plate and an adjustable member which enables the support hook to be moved with respect to the hanger plate until such time as the connection flange is snugly engaged with the hanger plate.

6. A nuclear reactor comprising;
   a shroud disposed within a reactor vessel so as to surround at least one fuel assembly; and
   a shroud support arrangement for supporting said shroud in the reactor vessel, comprising:
   a support ring disposed on the upper peripheral edge of said shroud, said support ring being adapted to have a shroud head seat on top thereof; and
   a plurality of hangers which are fixedly connected at their upper ends to said support ring and which extend down along the external peripheral surface of said shroud to a level which is above a stepped diameter portion of said shroud which includes a radially inward extending surface portion;
   a plurality of hanger plates, each of said hanger plates being rigidly connected to a hanger; and
   a plurality of support hooks which are each adapted to be detachably supported on a hanger plate and which are so shaped and dimensioned that a hook portion formed on each of said support hooks fits under said inwardly extending surface portion, each of said support hooks being provided with a lock bolt which can be adjusted in a manner to engage a hanger plate and produce a reaction which causes said hook portion to engage with said horizontally extending surface, said support hooks each having a vertically extending edge portion which is engagable with the inner periphery of said reactor vessel to prevent said shroud from undergoing lateral motion within said reactor vessel.

7. A method of supporting a shroud with a nuclear reactor pressure vessel, comprising the steps of:
lowering a support ring structure having a plurality of support hook supporting members thereon, into the pressure vessel;
securing the support ring to an upper portion of the shroud;
lowering support hooks into the pressure vessel;
mounting the support hooks on said hook supporting members and securing said support hooks in position on said hook supporting members, said support hooks each having a vertical shoulder portion which closely juxtaposes the inner periphery of the pressure vessel wall when mounted on a hook supporting member under ambient temperature conditions.

8. A method of supporting a shroud with a nuclear reactor pressure vessel as set forth in claim 7, further comprising the step of rotating the support ring structure to move the hook support members into positions below projections which are formed on said shroud.

9. A method of supporting a shroud with a nuclear reactor pressure vessel, as set forth in claim 7, wherein said step of securing the support ring on an upper portion of said shroud comprises:
placing a flat annular portion of said support ring structure on an upper edge of said shroud and;
placing a shroud head on top of said flat annular portion.

10. A method of supporting a shroud with a nuclear reactor pressure vessel, as set forth in claim 7, wherein said step of mounting includes:
hooking a connecting flange formed on each of said support hooks onto a portion of a hook support member; and
adjusting an adjustable member in a manner which moves said connecting flange into engagement with the hooks supporting member on which the support hook is disposed and into a position wherein said support hook cannot be detached from said hook support member.

* * * * *